April 24, 1928.  H. A. ELLIS  1,667,249
APPARATUS FOR COMPARING THE COLOR OF LIQUIDS BY
REFLECTED AND TRANSMITTED LIGHT
Filed Feb. 25, 1925
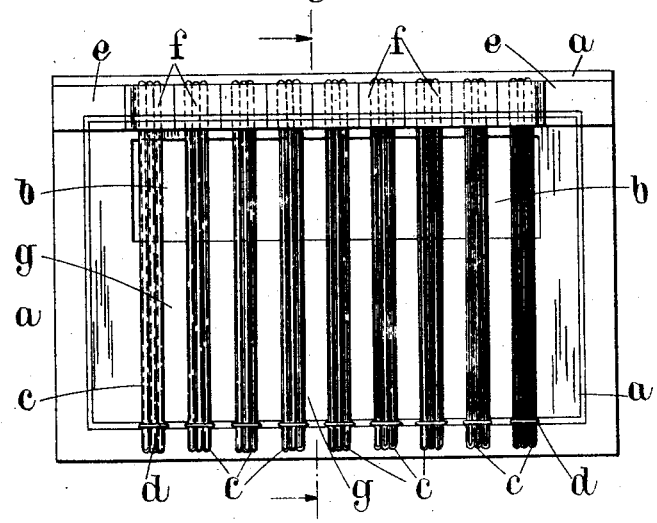
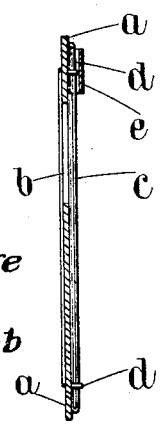
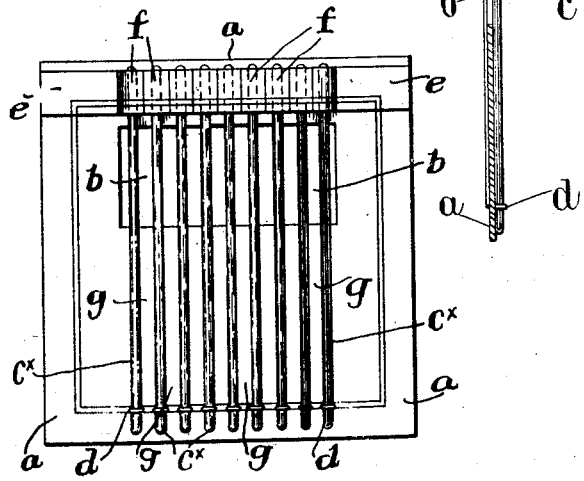
INVENTOR
Henry A. Ellis
BY Babcock
ATTORNEYS Patented Apr. 24, 1928.

1,667,249

UNITED STATES PATENT OFFICE.

HENRY AUGUSTUS ELLIS, OF LONDON, ENGLAND, ASSIGNOR TO THE BRITISH DRUG HOUSES, LIMITED, OF LONDON, ENGLAND, A CORPORATION OF GREAT BRITAIN.

APPARATUS FOR COMPARING THE COLOR OF LIQUIDS BY REFLECTED AND TRANSMITTED LIGHT.

Application filed February 25, 1925, Serial No. 11,451, and in Great Britain November 12, 1924.

This invention relates to apparatus employed for comparing the color of liquids by reflected and transmitted light and has for its object improvements whereby the color of liquids may be more conveniently and reliably compared with the color of one or more standard liquids such as in the colorimetric determination of the hydrogen ion concentration.

According to the ionic hypothesis acids are regarded as "salts" of hydrogen and the property of acidity has been found to be due to the power of acids to increase the hydrogen ions, the concentration of which determines the degree of acidity.

The presence of an acid can be shown by the employement of suitable indicators, such as thymol blue, methyl orange, methyl red, and the hydrogen ion concentration can be ascertained by the depth and tint of color of the solution to which such indicators have been added. According to the said hypothesis bases are regarded as hydroxyl salts whose alkaline property is due to the presence of hydroxyl ions, the concentration of which may also be ascertained by the color of the solution to which an indicator has been added, which determines its alkalinity.

To ascertain the hydrogen or hydroxyl ion concentration comparison is made with a range of standard colors corresponding with the different degrees of concentration.

It is found in practice that more satisfactory results are obtained when the standard color is represented by a colored fluid contained in a transparent vessel of the same shape (cylindrical, for example) and of the same dimensions as that containing the liquid undergoing examination in order that the modifications of color due to refraction and dispersion may be the same in both cases.

I have found it convenient to use a capillary tube to hold the liquid to be compared but it has been found difficult in some cases to compare the color of the liquid in so small a tube with the color of the standard liquid contained in an equally small tube owing to the narrow band of color it affords.

It is therefore a further object of the present invention to provide a device in which the conditions under which the two fluids are compared are identical while providing a band of substantial width of the standard color.

According to the present invention a group of two or more capillary tubes each containing a "buffer" solution colored with the same amount of an indicator, are mounted on a sheet of white card or other suitable material from which light may be reflected, provided with an opening through which transmitted light may pass. This opening is wide enough to allow the tube or tubes containing the liquid to be compared to be placed over it and parallel to those containing the standard color.

In some cases a series of such tubes or groups of tubes representing a range of colors corresponding with different degrees of concentration, are mounted on a sheet of suitable material transversely to the opening therein, the arrangement being such that each group has a space between it and the next in which the tube or tubes containing the specimen to be compared may be placed parallel to the tubes containing the standard colors, so that the light will pass through them at the same angle. A number or other indication of the strength is preferably associated with each group of tubes.

I will now proceed to more particularly describe my invention with reference to the accompanying drawings, in which—

Fig. 1 shows one form of the improved apparatus in front elevation;

Fig. 2 is a section on the line 2—2 in Fig. 1; and

Fig. 3 is a view, similar to Fig. 1, illustrating another embodiment of the invention.

According to the construction shown in the drawings, a sheet $a$ of card-board has a slot or opening $b$ and a series of groups $c$ of tubes secured to it by stitches $d$ or other convenient means. A strip $e$ of sheet material is suitably secured to the sheet $a$ adjacent to the tube and may be provided with numerals at $f$ or other indications of the degree of concentration corresponding with each of the groups $c$.

In practice one or a group of tubes of equal shape and dimensions to those constituting the groups $c$ is filled with the liquid to be examined and placed in one or other of the spaces $g$ and the color of the light transmitted direct through the opening $b$ and the said tube or group of tubes as well as the color of the light transmitted through the said tube or tubes after reflection from the surface of the sheet a, is compared with the color of the light transmitted direct and after reflection through the group of tubes c. For this purpose the tubes should be directed towards the source of the light.

According to the construction or modification illustrated in Fig. 3 a series of single tubes $c^x$ are employed instead of the groups shown in Fig. 1.

I claim:

1. A device for comparing the color of translucent objects by reflected and transmitted light simultaneously comprising a base of suitable material having a reflecting surface; an opening formed therein; a translucent object of standard color secured thereto in a position to allow light reflected from the surface of said base and transmitted through the opening therein to pass through said translucent standard and an object placed next it to be compared therewith, substantially as set forth.

2. A device for comparing the color of translucent objects by reflected and transmitted light simultaneously comprising a base of suitable material having a reflecting surface; an opening formed therein; a series of translucent objects of graduated standard colors secured to said base in a position to allow light reflected from the surface of said base and transmitted through the opening therein to pass through the said series of translucent standards; and spaces between each standard of the series to enable the object that is to be compared therewith to be successively juxtaposed to each standard, substantially as and for the purpose set forth.

3. A device for comparing the color of liquids by reflected and transmitted light simultaneously comprising a plate of suitable sheet material having a reflecting surface; an opening formed therein; a capillary tube of substantially uniform cross-section throughout its length containing colored fluid secured thereto in a position to allow light reflected from the surface of said base and transmitted through the opening therein to pass through said tube; and a tube of the same form and dimensions to contain the liquid to be compared therewith, substantially as set forth.

4. A device for comparing the color of liquids by reflected and transmitted light simultaneously comprising a plate of suitable sheet material having a reflecting surface; an opening formed therein; a group of contacting capillary tubes containing colored fluid secured thereto in a position to allow light reflected from the surface of said base and transmitted through the opening therein to pass through said tubes; and a similar group of tubes of the same form and dimensions to contain the liquid to be compared therewith, substantially as set forth.

5. A device for comparing the color of liquids by reflected and transmitted light simultaneously comprising a plate of suitable sheet material having a reflecting surface; an opening formed therein; a plurality of capillary tubes of substantially uniform cross-section throughout their length secured to said base in a position to allow light reflected from the surface of said base and transmitted through the opening therein to pass through said tubes; different standard colored fluids in each of the said tubes to constitute a graduated range; a space between each tube and a removable tube of the same form and dimensions to contain the liquid to be compared to be inserted in said spaces so as to be successively juxtaposed to each of the tubes containing the standard colored fluids, substantially as and for the purpose set forth.

6. A device for comparing the color of liquids by reflected and transmitted light comprising a plate of suitable sheet material having a reflecting surface; an opening formed therein; a plurality of groups of capillary tubes secured to said base in a position to allow light reflected from the surface of said base and transmitted through the opening therein to pass through said tubes; a different standard colored fluid in each group of tubes to constitute a graduated range; a space between each group of tubes and a removable tube of the same form and dimensions to contain the liquid to be compared to be inserted in said spaces so as to be successively juxtaposed to each of the groups of tubes containing the standard colored fluids, substantially as and for the purpose set forth.

7. A device for comparing the color of liquids by reflected and transmitted light comprising a plate of suitable sheet material having a reflecting surface; an opening formed therein; a plurality of groups of capillary tubes secured to said base in a position to allow light reflected from the surface of said base and transmitted through the opening therein to pass through said tubes; a different standard colored fluid in each group of tubes to constitute a graduated range; a space betwen each group of tubes; and a removable group of tubes of the same form and dimensions to contain the liquid to be compared, to be inserted in said spaces so as to be successively juxtaposed to each of the groups of tubes containing the standard colored fluids, substantially as and for the purpose set forth.

In testimony whereof, I have signed my name to this specification at London, England, this 26 day of January, 1925.

HENRY AUGUSTUS ELLIS.